United States Patent

Schubart et al.

[11] 3,931,060
[45] Jan. 6, 1976

[54] POLYURETHANE FOAM FREE FROM INTERNAL DISCOLORATION

[75] Inventors: Rüdiger Schubart, Cologne; Ulrich Nehen, Leverkusen; Ernst Roos, Odenthal-Osenau; Manfred Dahm, Bergisch-Neukirchen, all of Germany

[73] Assignee: Bayer Aktiengesellschaft, Bayerwerk, Germany

[22] Filed: Aug. 12, 1974

[21] Appl. No.: 496,616

[30] Foreign Application Priority Data

Aug. 14, 1973 Germany............................ 2340995

[52] U.S. Cl....................... 260/2.5 BB; 260/45.8 N; 260/45.8 NZ; 260/45.8 S; 260/45.85 H; 260/45.85 P; 260/77.5 SS
[51] Int. Cl.². C08G 18/30; C08K 5/13; C08K 5/47
[58] Field of Search ... 260/2.5 BB, 77.5 SS, 45.8 N, 260/45.8 NZ, 45.8 SN

[56] References Cited
UNITED STATES PATENTS

| | | | |
|---|---|---|---|
| 3,214,397 | 10/1965 | Cox............................ | 260/45.8 SN |
| 3,446,779 | 5/1969 | Finelli et al................. | 260/45.8 SN |
| 3,485,778 | 12/1969 | Oertel et al................. | 260/2.5 BB |
| 3,536,663 | 10/1970 | Oertel et al................. | 260/77.5 SS |
| 3,634,315 | 1/1972 | Hattori et al. ............... | 260/45.8 N |
| 3,635,862 | 1/1972 | Dunn .......................... | 260/45.8 N |
| 3,700,750 | 10/1972 | Yamanonchi et al.......... | 260/45.8 N |
| 3,703,489 | 11/1972 | Morehouse .................. | 260/77.5 SS |
| 3,715,381 | 2/1973 | Spaunburgh et al.......... | 260/77.5 SS |
| 3,772,218 | 11/1973 | Lamplugh et al............. | 260/2.5 BB |

*Primary Examiner*—H. S. Cockeram
*Attorney, Agent, or Firm*—Joseph C. Gil

[57] ABSTRACT

Polyurethane foams which are free from the usual discoloration particularly in the center of a block thereof are prepared from a foamable reaction mixture containing a. a heterocyclic mercapto compound of the formula

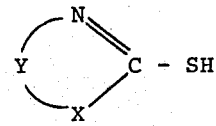

in which X = —O—, —S—, —NH—, —N—($C_1$-$C_{12}$)—alkyl, —N—($C_5$-$C_6$)—cycloalkyl—, —N—phenyl, —N—($C_7$-$C_{12}$)—aralkyl, —N—($C_7$-$C_{12}$)—alkylaryl— or —N—CO—($C_1$-$C_6$)—alkyl,

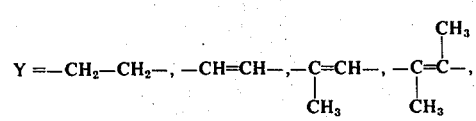

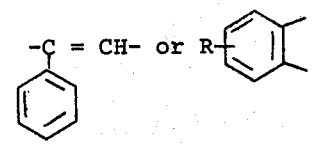

R = H, ($C_1$-$C_{12}$)—alkyl, ($C_1$-$C_{12}$)—alkoxycarbonyl—, ($C_1$-$C_{12}$)—alkoxy and b. a phenol of the general formula

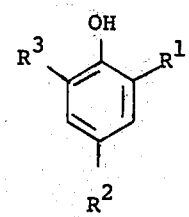

in which $R^1$ and $R^3$ may be the same or different and denote $C_1$-$C_9$—alkyl—, $C_5$-$C_6$—cycloalkyl—, $C_7$-$C_9$—alkylaryl—, indanyl or norbornyl groups and $R^2$ = $R^1$ or —$CH_2$—$CH_2$—COO—($C_1$-$C_{12}$)—alkyl.

7 Claims, No Drawings

POLYURETHANE FOAM FREE FROM INTERNAL DISCOLORATION

This invention relates generally to polyurethane foams and more particularly to a process of making polyurethane foams which are substantially free from the discoloration which occurs frequently when a block of foam is produced.

Foams with a wide variety of physical properties have for a long time been produced on a technical scale by the isocyanate polyaddition process. This process uses compounds which contain active hydrogen atoms, in particular compounds which contain hydroxyl and/or carboxyl groups, and polyisocyanates, optionally with the addition of water, activators, emulsifiers, foam stabilizers and other additives (R. Vieweg, A. Hochtlen, Kunststoff-Handbuch, Volume VII, Polyurethanes, published by Carl-Hanser-Verlag, Munich 1966). With suitable choice of the components, elastic foams, rigid foams or foams having intermediate properties can be produced by this process.

The starting materials which are to be reacted together may either all be mixed together at once or a prepolymer which contains NCO-groups may first be prepared from a polyhydroxyl compound such as a polyalkylene glycol ether or polyester which contains hydroxyl groups and an excess of a polyisocyanate, and this prepolymer may then be converted into the foam by reaction with water.

In the foaming process, and especially when foams with low densities are being produced or when a relatively large quantity of isocyanate is used, undesirable discoloration phenomena occur in the block of foam and the foam may assume a yellow to brown color, especially at the center of the block where the temperature rises most sharply due to the heat of reaction. This discoloration is often increased by the substances used in the foaming mixture, such as tertiary amines which are used as catalysts or polyethers which contain amino groups or various metal compounds which may be present as impurities, e.g. compounds of iron, copper, nickel or cobalt. Halogen compounds, which are frequently used as blowing agents, may also have a certain discoloring effect, as may also other additives used as flame-retarding agents such as tris-$\beta$-chloroethyl phosphate.

Attempts have already been made to prevent this undesirable discoloration at the core of the foam by adding phenolic compounds, e.g. 2,2'-methylene-bis-(4-methyl-6-tert.-butyl phenol), 2,6-di-tert.-butyl-p-cresol, 2,4-di-tert.-butyl-6-methyl phenol or 4,4'-butylidene-bis-(2-tert.-butyl-5-methyl phenol) (U.S. Pat. Nos. 3,280,049; 3,385,820 and 3,494,880).

Although the phenolic compounds are effective when small blocks are produced, technological advancements have made it possible to produce foam blocks with greater height and lower density than before. It has been found that this has considerably increased the risk of discoloration at the center of the block due to the increased reaction temperature. The phenolic compounds mentioned above are not sufficiently effective when used alone to prevent discoloration at the center of large blocks when used in larger quantities.

It is also known that 2-mercaptobenzimidazole may be used as a stabilizer for polyurethane foams to protect them against the influence of light and oxygen (German Auslegeschrift No. 1,056,368). However, when 2-mercaptobenzimidazole is used at low concentrations in an attempt to prevent discoloration of the center of high polyurethane foam blocks with low density, the results are unsatisfactory for the same reasons as explained above in connection with phenolic compounds. From German Auslegeschrift No. 1,694,444 it is also known to use 2-mercaptobenzimidazole with mixtures of an organic halogen compound and a polyol which are unstable in storage. The Auslegeschrift, however, contains no indication that discoloration at the center of polyurethane foams is prevented by 2-mercaptobenzimidazole.

It is an object of this invention to provide a process for making polyurethane foam blocks without discoloration particularly at the center of the block. Another object of the invention is to provide relatively large blocks of polyurethane foam which are substantially free from the yellow and brown discolorations frequently caused by light and/or oxidation.

The foregoing objects and others are accomplished in accordance with this invention, generally speaking, by providing a process for making polyurethane foams wherein a phenol and a heterocyclic mercapto compound are included in the foamable reaction mixture from which the foam is prepared.

It has now surprisingly been found that mixtures of certain phenols and mercapto compounds in a foamable reaction mixture prevent discoloration at the center of polyurethane foam blocks.

This finding is all the more surprising in view of the fact that the individual compounds, i.e. both the phenols and the mercapto compounds when used on their own are not capable of completely eliminating discoloration at the center of polyurethane foams produced under technical conditions.

Another surprising finding is that when the two classes of compounds are used in combination with each other they have a disproportionately powerful effect, a phenomenon which is generally known as synergism. An effect is said to be synergistic when, for example, the resistance to oxidation obtained in a polymer by using two or more different antioxidants is distinctly higher than the sum of the effects obtained from the individual substances used separately (J. Voigt, Die Stabilisierung der Kunststoffe gegen Licht und Warme, Springer-Verlag Berlin 1966).

The existance of synergism between the phenolic and mercapto compound has the advantage that only small quantities of the mixture are required to eliminate discoloration at the center. Moreover, it has been found that if the concentration is increased, the increase in the effect of the mixture is more than proportional to the increase in concentration.

Another advantage is that by varying the quantity of the two components in the mixture, the effect can be specifically improved and adapted to the intensity of the discoloration.

This invention therefore, provides a process for producing polyurethane foams from an organic polyisocyanate, a compound which contains at least two active hydrogen atoms, a blowing agent, a catalyst, a substance which prevents discoloration at the center of the resulting foam product and optionally foam stabilizers and other additives, characterized in that the substance used to prevent discoloration at the center of the block is a mixture of a. a heterocyclic mercapto compound of the general formula

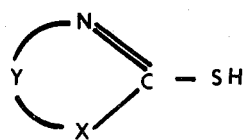

in which
X = —O—, —S—, —NH—, —N—(C₁-C₁₂)-alkyl, —N—(C₅-C₆)—cycloalkyl, —N—phenyl, —N—(C₇-C₁₂)-aralkyl—, —N—(C₇-C₁₂)—alkylaryl— or —N—CO—(C₁-C₆)—alkyl
Y = —CH₂—CH₂—, —CH=CH—,

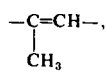

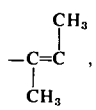

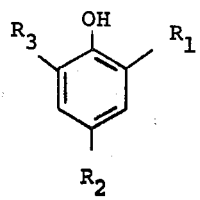

R = H, (C₁-C₁₂)—alkyl, (C₁-C₁₂)—alkoxy carbonyl—, or (C₁-C₁₂—alkoxy—; and
b. a phenol of the general formula

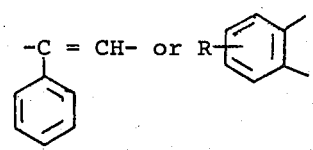

in which R₁ and R₃ may be the same or different and denote C₁-C₉—alkyl, C₅-C₆—cycloalkyl, C₇-C₉—alkylaryl, indanyl or norbornyl groups and R₂ = R₁ or —CH₂—CH₂—COO—(C₁-C₁₂)—alkyl.

The invention also provides a foamable mixture containing a compound which contains at least two active hydrogen atoms, a blowing agent, catalyst and, as a substance to prevent discoloration at the center of the block a mixture of
a. a heterocyclic mercapto compound of the general formula

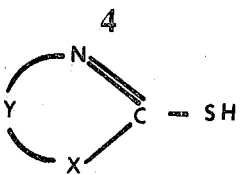

in which
X = —O—, —S—, —NH—, —N—(C₁-C₁₂)—alkyl, —N—(C₅-C₆)—cycloalkyl—, —N phenyl, —N—(C₇-C₁₂)—aralkyl—, —N—(C₇-C₁₂)—alkylaryl or —N—CO—(C₁-C₆)—alkyl
Y = —CH₂—CH₂—, —CH=CH—,

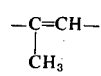

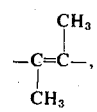

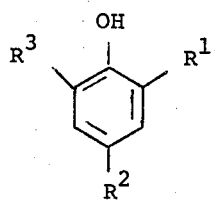

R = H, (C₁-C₁₂)—, alkyl, (C₁-C₁₂)—, alkoxy—carbonyl—, (C₁-C₁₂)—, alkoxy—; and
b. a phenol of the general formula

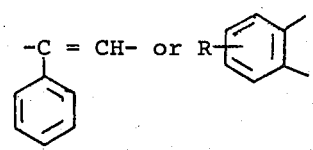

in which R¹ and R³ may be the same or different and denote C₁-C₉—alkyl, C₅-C₆—cycloalkyl, C₇-C₉—alkylaryl—, indanyl or norbornyl groups and R₂ = R₁ or —CH₂—CH₂—COO—(C₁-C₁₂)-alkyl and optionally foam stabilizers and other additives.

The effect of substances mentioned above and of the mixtures prepared from them probably lies in preventing the reactions with free radicals which presumably cause the discoloration in the interior of the foam blocks. Since free radicals are produced particularly readily by treatment with oxygen, the effect of the phenols and heterocyclic mercapto compounds and of the synergistic mixtures prepared from them can be determined by measuring the time after which absorption of oxygen takes place. At that moment, the stabilizer is used up, and the length of time until that point is reached is a direct measure of the effectiveness of the substance or mixture of substances.

Any suitable phenol and mercapto compound of the above formulae may be used such as, for example, 2,6-di-tert.-butyl-p-cresol,
2-tert.-butyl-6-cyclohexyl-p-cresol,
2-tert.-butyl-6-cyclopentyl-p-cresol,
2-methyl-6-cyclopentyl-p-cresol,
2-methyl-6-norbornyl-p-cresol,
2-tert.-butyl-6-norbornyl-p-cresol,
2,6-di-cyclopentyl-p-cresol,
2-tert.-butyl-6-indanyl-p-cresol,
2,6-di-tert.-butyl-4-ethyl-phenol,
2,4,6-tris-α-methylbenzyl-phenol,
2,6-di-cyclohexyl-p-cresol,
2-tert.-butyl-6-α-methylcyclohexyl-p-cresol,
2,5-di-tert.-butyl-4-hydroxy-phenyl-propionic acid octyl ester,
2,6-di-o-methylbenzyl-p-cresol,
2-tert.-butyl-6-α-methylbenzyl-p-cresol,
2-cyclohexyl-6-α-methylbenzyl-p-cresol,
2,6-di-α-dimethylbenzyl-p-cresol,
2-mercaptobenzimidazole,
2-mercapto-4,5-dimethyl thiazole,
2-mercapto-4-methyl thiazole,
2-mercapto-4-ethoxycarbonyl-5-methyl thiazole,
2-mercapto-4-tert.-butyl-thiazole,
1-ethoxycarbonyl-2-mercaptobenzimidazole,
2-mercapto-4-isopropyl-5-methyl thiazole,
2-mercapto-4-isopropyl thiazole,
1-methyl-2-mercaptobenzimidazole,
2-mercaptobenzothiazole,
1-(2-ethyl)-hexyl-2-mercaptobenzimidazole, and
2-mercaptobenzoxazole.

The mixtures according to the invention are advantageously used in a quantity of about 0.01% to 5% by weight, preferably about 0.2% to about 2% by weight, based on the weight of the reaction mixture, and the proportion by weight of phenol to heterocyclic mercapto compound may be between about 1:99 and 99:1, preferably between about 30:70 and 70:30%.

In the foaming process, the mixtures according to the invention or individual components thereof may be added to one of the reactants, e.g. to the polyol, either during or after its preparation, or to the organic polyisocyanate.

The mixtures according to the invention or individual components may be added in the form of very concentrated solutions in suitable solvents to the polyol during or after its preparation or to the organic polyisocyanate. The solutions may also be added separately to the foaming mixture.

Preparation of the phenols and heterocyclic mercapto compounds is carried out by known methods.

Any suitable organic polyisocyanate may be used in practicing the invention such as, for example, aliphatic, cycloaliphatic, araliphatic, aromatic or heterocyclic polyisocyanates including those described e.g. by W. Siefgen in Justus Liebigs Annalen der Chemie, 562, pages 75 to 136, for example, ethylene diisocyanate, tetramethylene-1,4-diisocyanate, hexamethylene-1,6-diisocyanate, dodecane-1,12-diisocyanate, cyclobutane-1,3-diisocyanate, cyclohexane-1,3- and -1,4-diisocyanate and any mixtures of these isomers, 1-isocyanato-3,3,5-trimethyl-5-isocyanatomethyl-cyclohexane (DAS No. 1,202,785), hexahydrotolylene-2,4- and -2,6-diisocyanate and any mixtures of these isomers, hexahydro-1,3- and/or -1,4-phenylene-diisocyanate, perhydro-2,4'- and/or -4,4'-diphenylmethane-diisocyanate, phenylene-1,3- and -1,4-diisocyanate, tolylene-2,4- and -2,6-diisocyanate and any mixtures of these isomers, diphenylmethane-2,4'- and/or -4,4'-diisocyanate, naphthylene-1,5-diisocyanate, triphenylmethane-4,4', 4''-triisocyanate, polyphenyl-polymethylene-polyisocyanates which can be obtained by aniline-formaldehyde condensation followed by phosgenation and which have been described e.g. in British Pat. Specification Nos. 874,430 and 848,671, perchlorinated aryl polyisocyanates as described e.g. in German Auslegeschrift No. 1,157,601, polyisocyanates which contain carbodiimide groups as described in German Pat. No. 1,092,007, the diisocyanates described in U.S. Pat. No. 3,492,330, polyisocyanates which contain allophanate groups as described e.g. in British Pat. Specification No. 994,890, Belgian Pat. No. 761,626, and published Dutch Pat. application No. 7,102,524 polyisocyanates which contain isocyanurate groups as described e.g. in German Pat. Nos. 1,022,789; 1,222,067 and 1,027,394 and in German Offenlegungsschrift Nos. 1,929,034 and 2,004,048 polyisocyanates which contain urethane groups as described e.g. in Belgian Pat. No. 752,261 or in U.S. Pat. No. 3,394,164, polyisocyanates which contain acylated urea groups in accordance with German Pat. No. 1,230,778, polyisocyanates which contain biuret groups as described e.g. in German Pat. No. 1,101,394 in British Pat. Specification No. 889,050 and in French Pat. No. 7,017,514 polyisocyanates which are prepared by telomerization reactions as described e.g. in Belgian Pat. No. 723,640 polyisocyanates which contain ester groups as mentioned e.g. in British Pat. Specification Nos. 956,474 and 1,072,956 in U.S. Pat. No. 3,567,763 and in German Pat. No. 1,231,688 and reaction products of the above mentioned isocyanates with acetals in accordance with German Pat. No. 1,072,385.

The distillation residues which are obtained from the commercial production of isocyanates and still contain isocyanate groups may also be used, optionally as solutions in one or more of the above mentioned polyisocyanates. Any mixtures of the above mentioned polyisocyanates may also be used.

It is generally preferred to use commercially readily available polyisocyanates such as tolylene-2,4- and -2,6-diisocyanate and any mixtures of these isomers ("TDI"), polyphenyl-polymethylene-polyisocyanates which can be obtained by aniline-formaldehyde condensation followed by phosgenation ("crude MDI") and polyisocyanates which contain carbodiimide groups, urethane groups, allophanate groups, isocyanurate groups, urea groups or biuret groups ("modified polyisocyanates").

The starting components for use according to the invention also include any suitable organic compound which contains at least two hydrogen atoms capable of reacting with isocyanates; these compounds preferably have a molecular weight of 400–10,000. These include compounds which contain amino groups, thiol groups or carboxyl groups but the compounds of this kind preferably used are polyhydroxyl compounds, in particular those which contain 2 to 8 hydroxyl groups and especially those with a molecular weight of 800 to 10,000, preferably 1000 to 6000 e.g. polyesters, polyethers, polythioethers, polyacetals, polycarbonates or polyester amides which contain at least two and generally 2 to 8 but preferably 2 to 4 hydroxyl groups of the kind known per se for the production of both homogeneous and cellular polyurethanes.

Any suitable polyester with hydroxyl groups may be used as one of the starting materials, e.g. reaction products of polyvalent alcohols, preferably divalent alcohols with the optional addition of trivalent alcohols, and polybasic, preferably dibasic carboxylic acids. Instead of the free polycarboxylic acids, the corresponding polycarboxylic acid anhydrides or corresponding polycarboxylic acid esters of lower alcohols or mixtures thereof may be used for preparing the polyesters. The polycarboxylic acids may be aliphatic, cycloaliphatic, aromatic and/or heterocyclic and may be substituted, e.g. with halogen atoms, and/or unsaturated. The following are examples: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid optionally mixed with monomeric fatty acids, dimethyl terephthalate and bis-glycol terephthalate. Any suitable polyhydric alcohol may be used to prepare the polyester e.g. ethylene glycol, propylene-1,2- and -1,3-glycol, butylene-1,4- and -2,3-glycol, hexane-1,6-diol, octane-1,8-diol, neopentyl glycol, cyclo-hexane dimethanol (1,4-bis-hydroxymethyl cyclohexane), 2-methyl-1,3-propanediol, glycerol, trimethylol propane, hexane-1,2,6-triol, butane-1,2,4-triol, trimethylol ethane, pentaerythritol, quinitol, mannitol and sorbitol, methyl glycoside, diethylene glycol, triethylene glycol, tetraethylene glycol, polyethylene glycols, dipropylene glycol, polypropylene glycols, dibutylene glycol and polybutylene glycols. A certain proportion of the polyesters may contain carboxyl end groups. Polyesters of lactones such as $\epsilon$-caprolactone or hydroxycarboxylic acids such as $\omega$-hydroxycaproic acid may also be used.

Any suitable polyether which contains at least two and generally two to eight and preferably two to three hydroxyl groups may be used. For example, polyethers prepared by polymerizing epoxides such as ethylene oxide, propylene oxide, butylene oxide, tetrahydrofuran, styrene oxide or epichlorohydrin, each with itself, e.g. in the presence of $BF_3$ or by addition of these epoxides, optionally as mixtures or successively, to initiators which contain reactive hydrogen atoms such as alcohols or amines, e.g. water, ethylene glycol, propylene-1,3- or -1,2-glycol, trimethylolpropane, 4,4'-dihydroxy-diphenyl-propane, aniline, ammonia, ethanolamine or ethylene diamine. Sucrose polyethers such as those described e.g. in German Auslegeschrift Nos. 1,176,358 and 1,064,938 may also be used according to the invention. It is in many cases preferred to use those poly (alkylene ether) polyols which contain predominantly primary OH-groups (up to 90% by weight, based on all the OH-groups present in the polyether). Polyethers which have been modified with vinyl polymers, e.g. those which are obtained by polymerizing styrene or acrylonitrile in the presence of polyethers (U.S. Pat. Nos. 3,383,351; 3,304,273; 3,523,093 and 3,110,695 and German Pat. No. 1,152,536) and polybutadienes which contain OH-groups are also suitable.

Any suitable polythioether may be used such as, for example, the condensation products of thiodiglycol with itself and/or with other glycols, dicarboxylic acids, formaldehyde, aminocarboxylic acids or amino alcohol. The products obtained are either polythio mixed ethers, polythio ether esters or polythioether ester amides, depending on the cocomponents.

Any suitable polyacetal may be used, e.g. the compounds which can be prepared from glycols such as diethylene glycol, triethylene glycol, 4,4'-dioxethoxy-diphenyl dimethylmethane or hexanediol and formaldehyde. Polyacetals suitable for the purpose of the invention may also be obtained by polymerizing cyclic acetals.

Any suitable polycarbonate with hydroxyl groups may be used e.g. those which can be prepared by reacting diols such as propane-1,3-diol, butane-1,4-diol and/or hexane-1,6-diol, diethylene glycol, triethylene glycol or tetraethylene glycol with diaryl carbonates such as diphenyl carbonate or phosgene.

Any suitable polyester amide or polyamides may be used e.g. the predominantly linear condensates obtained from polybasic saturated and unsaturated carboxylic acids or their anhydrides and polyvalent saturated and unsaturated amino alcohols, diamines, polyamines and mixtures thereof.

Polyhydroxyl compounds which already contain urethane or urea groups as well as optionally modified natural polyols such as castor oil, carbohydrates or starch may also be used. Addition products of alkylene oxides with phenol formaldehyde resins or with urea formaldehyde resins are also suitable for the purpose of the invention.

Representatives of these compounds and processes which are to be used according to the invention have been described e.g. in High Polymers, Vol. XVI, "Polyurethanes, Chemistry and Technology" by Saunders-Frisch, Interscience Publishers, New York, London, Volume I, 1962, pages 32–42 and pages 44–54 and Volume II, 1964, pages 5–6 and 198–199 and in Kunststoff-Handbuch, Volume VII, Vieweg-Hochtlen, Carl HanserVerlag, Munich 1966, e.g. on pages 45 to 71.

According to the invention, water and/or any suitable readily volatile organic substance may be used as the blowing agent. Suitable organic blowing agents are e.g. acetone, ethyl acetate, methanol, ethanol, halogenated alkanes such as methylene chloride, chloroform, ethylidene chloride, vinylidene chloride, monofluorotrichloromethane, chlorodifluoromethane, dichlorodifluoromethane, butane, hexane, heptane, diethylether and the like. Compounds which decompose at temperatures above room temperature to liberate gases such as nitrogen, e.g. azo compounds such as azoisobutyric acid nitrile, may also act as blowing agents. Other examples of blowing agents and details of methods of using them may be found in Kunststoff-Handbuch, Volume VII, published by Vieweg and Hochtlen, Carl Hanser-Verlag, Munich 1966, e.g. on pages 108 and 109, 453 to 455 and 507–510.

Conventional catalyst for the urethane reaction are also used according to the invention. The catalysts used may be any of those known per se, e.g. tertiary amines such as triethylamine, tributylamine, N-methyl-morpholine, N-ethyl-morpholine, N-cocomorpholine, N,N,N',N'-tetramethyl-ethylene diamine, 1,4-diaza-bicyclo-(2,2,2)-octane, N-methyl-N'-dimethyl aminoethyl-piperazine, N,N-dimethyl benzylamine, bis-(N,N-diethyl aminoethyl) adipate, N,N-diethyl benzylamine, pentamethyl diethylene triamine, N,N-dimethyl cyclohexylamine, N,N,N', N'-tetramethyl-1,3-butane diamine, N,N-dimethyl-$\beta$-phenyl ethylamine, 1,2-dimethyl imidazole, 2-methyl imidazole or the like.

Suitable tertiary amines which contain hydrogen atoms that are reactive with isocyanate groups include, for example, triethanolamine, triisopropanolamine, N-methyl-diethanolamine, N-ethyl-diethanolamine, N,N-dimethyl-ethanolamine and their reaction products with alkylene oxides such as propylene oxide and/or ethylene oxide.

Silaamines which contain carbon-silicon bonds as described e.g. in German Pat. No. 1,229,290 may also be used as catalysts, e.g. 2,2,4-trimethyl-2-silamorpholine or 1,3-diethylaminomethyl-tetramethyl disiloxane.

Bases which contain nitrogen such as tetraalkyl ammonium hydroxides, alkali metal hydroxides such as sodium hydroxide, alkali metal phenolates such as sodium phenolate and alkali metal alcoholates such as sodium methylate may also be used as catalysts. Hexahydrotriazines are also suitable catalysts.

Organic metal compounds may also be used as catalysts according to the invention, in particular organic tin compounds.

The organic tin compounds used are preferably tin (II)-salts of carboxylic acids, such as tin(II)-acetate, tin(II)-octoate, tin(II)-ethyl hexoate and tin(II)-laurate and the dialkyl tin salts of carboxylic acids, e.g. dibutyl tin diacetate, dibutyl tin dilaurate, dibutyl tin maleate or dioctyl tin diacetate.

Other representatives of catalysts which may be used according to the invention and details of the action of these catalysts are described in Kunststoff-Handbuch, Volume VII, published by Vieweg and Hochtlen, Carl Hanser-Verlag, Munich 1966, e.g. on page 96 to 102.

Any catalytic amount of the catalysts may be used. The amount of catalyst may be between about 0.001% and 10% by weight, based on the quantity of compounds with a molecular weight of 400 to 10,000 which contain at least two hydrogen atoms capable of reacting with isocyanates.

Surface-active additives (emulsifiers and foam stabilizers) may also be included in the reaction mixture according to the invention. The emulsifiers used may be e.g. sodium salts of castor oil sulphonates or of fatty acids or salts of fatty acids with amines such as diethylamine oleate or diethanolamine stearate. Alkali metal or ammonium salts of sulphonic acids such as dodecyl benzene sulphonate or dinaphthyl methane disulphonate or of fatty acids such as ricinoleic acid or of polymeric fatty acids may also be used as surface-active additives.

Any suitable foam stabilizer may be used such as, for example, water-soluble polyether siloxanes. These compounds generally have a structure such that a copolymer of ethylene oxide and propylene oxide is attached to a polydimethyl siloxane group. Foam stabilizers of this kind have been described e.g. in U.S. Pat. No. 3,629,308 the disclosure of which is incorporated herein by reference.

Reaction retarders may also be used according to the invention, e.g. substances which are acid in reaction such as hydrochloric acid or organic acid halides, as may also cell regulators known per se such as paraffins or fatty alcohols or dimethyl polysiloxanes and pigments or dyes and flame-retarding agents known per se, e.g. tris-chloroethyl phosphate or ammonium phosphate and polyphosphate, as well as stabilizers which protect against the effects of ageing and weathering, plasticizers, fungistatic and bacteriostatic substances and fillers such as barium sulphate, kieselguhr, carbon black or whiting.

Other examples of surface-active additives, foam stabilizers, cell regulators, reaction retarders, stabilizers, flame-retarding substances, plasticizers, dyes, fillers and fungistatic and bacteriostatic substances which may be used according to the invention and details of methods of using them and their mode of action have been described in Kunststoff-Handbuch, Volume VII, published by Vieweg and Hochtlen, Carl Hanser-Verlag, Munich 1966, e.g. on pages 103 to 113 and in the aforesaid Saunders and Frisch book.

According to the invention, the reactants are reacted together by the one-stage process known per se, prepolymer process or semi-prepolymer process, in many cases using mechanical devices, e.g. those described in U.S. Pat. No. 2,764,565. Details concerning the processing apparatus which may also be used according to the invention are given in Kunststoff-Handbuch, Volume VI, published by Vieweg and Hochtlen, Carl Hanser-Verlag Munich 1966, e.g. on pages 121 to 205.

The foams produced by the process according to the invention are suitable in all fields where polyurethane foams have previously been used, e.g. for the manufacture of upholstery elements, heat insulation, sound insulation, textile coating, packaging and the production of structural elements.

EXAMPLES

OXIDATION DELAY

Example 1 serves to demonstrate the slight effect which the individual phenols and heterocyclic mercapto compounds have in delaying oxidation. 0.1 part by weight of phenols A to H and of heterocyclic mercapto compounds I to XVII mentioned below are dissolved in each case in 100 parts by weight of a linear polypropylene glycol which has a hydroxyl number of 112 and the oxygen absorption is measured at 130°C and 150°C. The induction times shown in the table are obtained whereas the same polyether not containing the above mentioned compounds has an induction time of 2 minutes and 1 minute, respectively, at 130°C and 150°C. The induction time is the time during which the substrate is protected against oxidation. Uptake of oxygen takes place only after the end of this period of time. The longer the induction time, the greater is the effect of a stabilizer against oxidation. The induction time is measured manometrically in a Warburg apparatus. In accordance with the rule that the reaction velocity increases with temperature, the induction time decreases with increasing temperature.

| Compound | Induction time in minutes | |
| 0.1 part by weight | at 130°C | at 150°C |
| --- | --- | --- |
| none | 2 | <1 |
| A | 60 | 6 |
| B | >300 | 15 |
| C | 300 | 57 |
| D | 300 | 18 |
| E | 300 | 37 |
| F | 300 | 5 |
| G | 300 | 17 |
| H | 300 | 15 |
| I | 2 | <1 |
| II | 8 | <1 |
| III | 2 | <1 |
| IV | 2 | <1 |
| V | 2 | <1 |
| VI | 1 | <1 |
| VII | 1 | <1 |
| VIII to XVII | <1 | | symbol < denotes less than
symbol > denotes greater than

Compounds A to H have the following constitution:
Compound A
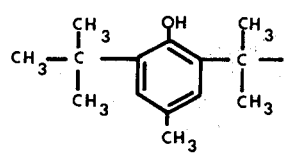
Compound B
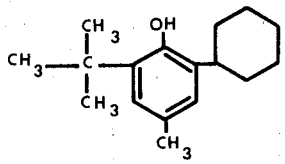
Compound C
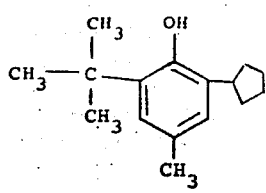
Compound D
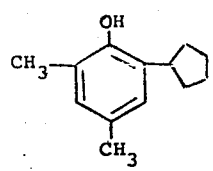
Compound E
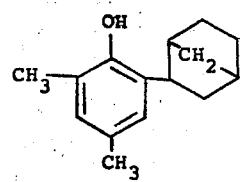
Compound F
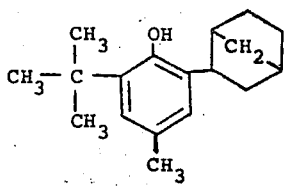
Compound G
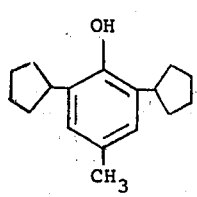
Compound H
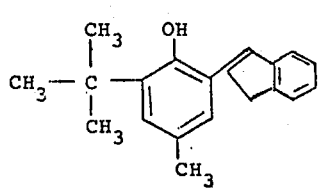
Compounds I to XVII have the following constitution:
Compound I
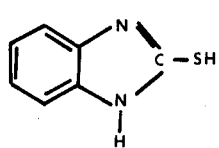
Compound II
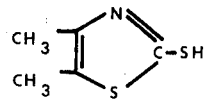
Compound III
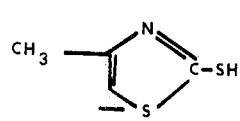
Compound IV
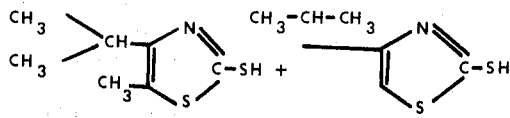

Compound V
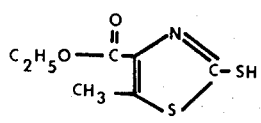
Compound VI
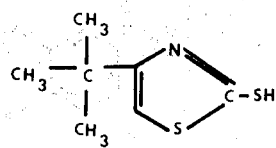
Compound VII
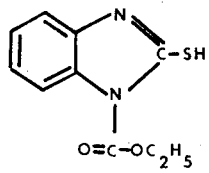
Compound VIII
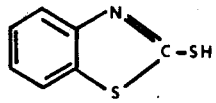
Compound IX
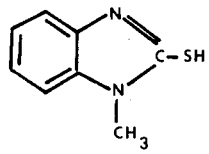
Compound X
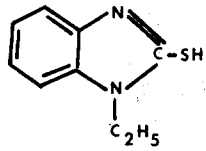
Compound XI
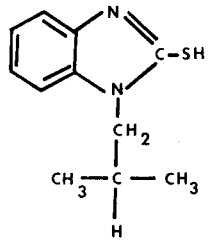
Compound XII
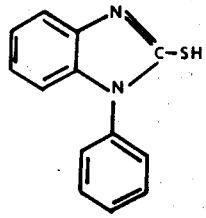
Compound XIII
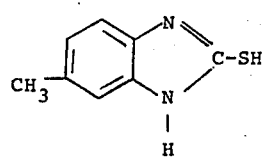
Compound XIV
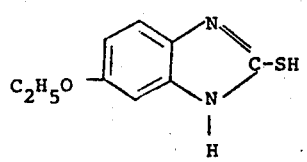

Compound XV

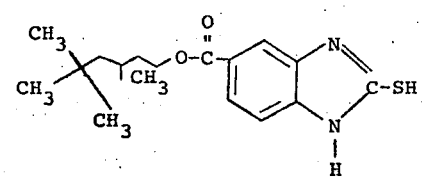

Compound XVI

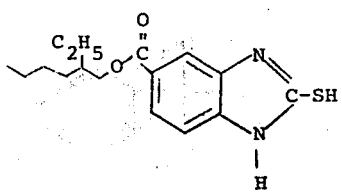

Compound XVII

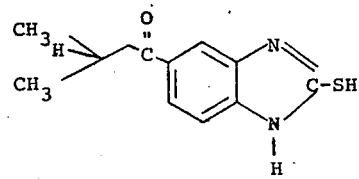

EXAMPLE 2

The synergistic increase in protection against oxidation by the combination of phenols and heterocyclic mercapto compounds is demonstrated by the following tests:

The pure products or product mixtures indicated in the following table are dissolved in 100 parts by weight of a linear polypropylene glycol with hydroxyl number 112 (molecular weight 1000) and the oxygen absorption is measured at 130°C, 150°C and 160°C. The induction times shown in the following table are obtained.

| Heterocyclic mercapto compound 0.1 part by weight | at 130°C | Induction time in minutes with 0.1 part by weight of phenol A at 130°C | at 150°C |
|---|---|---|---|
| none | 2 | 200 | 15 |
| I | 2 | >300 | 257 |
| II | 8 | >300 | 97 |
| III | 2 | >300 | 100 |
| IV | 2 | >300 | 58 |
| V | 2 | >300 | 66 |
| VI | 1 | >300 | 102 |
| VII | 1 | >300 | 207 |
| VIII | 1 | >300 | 105 |
| IX | 1 | >300 | 271 |
| X | 1 | >300 | 258 |
| XI | 1 | >300 | 222 |
| XII | 1 | >300 | 126 |
| XIII | 1 | >300 | 211 |
| XIV | 1 | >300 | 179 |
| XV | 1 | >300 | 101 |
| XVI | 1 | >300 | 88 |
| XVII | 1 | >300 | 147 |

EXAMPLES 3 to 6

The experiment described in Example 2 is repeated using other mixtures of phenols and heterocyclic mercapto compounds.

Example 3:

| Heterocyclic mercapto compound 0.1 part by weight | at 130°C | Induction time in minutes with 0.1 part by weight of phenol B at 150°C | at 160°C |
|---|---|---|---|
| I | 2 | >300 | 213 |
| II | 8 | >300 | 115 |
| III | >300 | 102 | |
| IV | 2 | >300 | 92 |
| V | 2 | 218 | |
| VI | 1 | >300 | 100 |
| VII | 1 | >300 | 88 |
| VIII | 1 | 161 | |
| IX | 1 | 205 | |
| X | 1 | 265 | |
| XI | 1 | 207 | |
| XII | 1 | 170 | |
| XIII | 1 | 208 | |
| XIV | 1 | 163 | |
| XV | 1 | 184 | |
| XVI | 1 | 136 | |
| XVII | 1 | 162 | |

EXAMPLE 4

The procedure is analogous to that in Example 2.

| Phenol 0.1 part by weight | at 150°C | Induction time in minutes with 0.1 part by weight of heterocyclic mercapto compound I at 150°C | at 160°C |
|---|---|---|---|
| A | 6 | 257 | 31 |
| B | 15 | >300 | 213 |
| C | 57 | >300 | 139 |

-continued

| Phenol 0.1 part by weight | Induction time in minutes with 0.1 part by weight of heterocyclic mercapto compound I | | |
|---|---|---|---|
| | at 150°C | at 150°C | at 160°C |
| D | 18 | >300 | 148 |
| E | 37 | >300 | 148 |
| F | 5 | >300 | 168 |
| G | 17 | 279 | |
| H | 15 | 166 | |

EXAMPLE 5

The procedure is analogous to that described in Example 2.

| Phenol 0.1 part by weight | Induction time in minutes with 0.1 part by weight of heterocyclic mercapto compound III | | |
|---|---|---|---|
| | at 150°C | at 150°C | at 160°C |
| A | 6 | 100 | |
| B | 15 | >300 | 102 |
| C | 57 | 249 | |
| D | 18 | 218 | |
| E | 37 | 230 | |
| F | 5 | 228 | |
| G | 17 | >300 | 110 |
| H | 15 | 177 | |

EXAMPLE 6

The procedure is analogous to that described in Example 2.

| Phenol 0.1 part by weight | Induction time in minutes with 0.1 part by weight of heterocyclic mercapto compound VII | | |
|---|---|---|---|
| | at 150°C | at 150°C | at 160°C |
| A | 6 | 207 | |
| B | 15 | >300 | 88 |
| C | 57 | 249 | |
| D | 18 | 227 | |
| E | 37 | 240 | |
| F | 5 | 262 | |
| G | 17 | 159 | |
| H | 15 | 114 | |

EXAMPLE 7

Production of polyurethane foams by machine foaming 100 parts by weight of a branched polyether based on propylene glycol and trimethylolpropane containing 7% of primary hydoxyl end groups (hydroxyl number 49) are reacted with 6.5 parts by weight of water, 0.15 parts by weight of 1,4-diazabicyclo-(2,2,2)-octane, 2.0 parts by weight of water-soluble polyether siloxane, 0.22 parts by weight of tin-(II)-octoate and 76 parts by weight of tolylene diisocyanate (80% of 2,4- and 20% of 2,6-isomer) to produce a soft polyurethane foam which has good physical properties. The foam has a dark brown discoloration in the interior. After the addition of the following phenols and heterocyclic mercapto compounds in the given concentrations to a foamable mixture of the same composition, the same soft polyurethane foams are obtained but they have no discoloration or a greatly reduced discoloration at the center.

| Phenol | | heterocyclic mercapto compound | | Discoloration at center of the foam |
|---|---|---|---|---|
| Quantity parts by weight | type | Quantity parts by weight | Type | |
| 0.1 | A | — | — | very dark brown |
| 0.2 | A | — | — | dark brown |
| 0.3 | A | — | — | dark brown |
| 0.1 | A | 0.1 | I | pale yellow |
| 0.1 | A | 0.15 | I | very pale yellow |
| 0.1 | A | 0.2 | I | none |
| 0.2 | A | 0.1 | I | pale yellow |
| 0.1 | B | — | — | very dark brown |
| 0.1 | B | 0.1 | I | pale yellow |

EXAMPLE 8

Production of polyurethane foams by manual foaming 100 parts by weight of a branched polyether based on propylene glycol and trimethylolpropane containing 7% of primary hydroxyl end groups (hydroxyl number 49) are reacted with 15 parts by weight of water, 0.15 parts by weight of 1,4-diazabicyclo-(2,2,2)-octane, 8.75 parts by weight of water-soluble polyether siloxane, 0.2 parts by weight of tin-(II)-octoate and 165 parts by weight of tolylene diisocyanate (80% 2,4- and 20% 2,6-isomer) to produce a polyurethane foam. The foam has a very dark brown discoloration in the interior. After addition of the following phenols and heterocyclic mercapto compounds at the given concentrations to a foamable reaction mixture having the same composition, the same polyurethane foams are obtained but they have no discoloration or only a much reduced dicoloration at the center. As can be seen from the following table, the results with regard to discoloration at the center are the same in manually-produced foams and in machine-produced foams.

| Phenol | | heterocyclic mercapto compound | | Discoloration at the center of the foam |
|---|---|---|---|---|
| Quantity parts by weight | Type | Quantity parts by weight | Type | |
| 0.1 | A | — | — | very dark brown |
| 0.1 | A | 0.15 | I | very pale yellow |
| 0.1 | A | 0.2 | I | none |
| 0.1 | A | 0.15 | II | pale yellow |
| 0.1 | A | 0.1 | IX | pale yellow |
| 0.1 | A | 0.1 | X | pale yellow |
| 0.1 | A | 0.15 | XI | very pale yellow |

Other phenols and aliphatic mercapto compounds having the formulae set forth herein before may be substituted in the foregoing examples for those selected for illustration.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. In a process for producing a polyurethane foam which is substantially free from discoloration at the center thereof from a foamable mixture containing an organic polyisocyanate, an organic compound which contains at least 2 active hydrogen atoms, a blowing agent and a catalyst for the reaction between the polyisocyanate and the said organic compound, the improvement which comprises effecting the reaction in the presence of a sufficient amount in effective proportions of a. a heterocyclic mercapto compound of the general formula

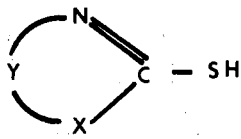

in which
X = —O—, —S—, —NH—, —N—($C_1$-$C_{12}$)—alkyl, —N—($C_5$-$C_6$)—cycloalkyl—, —N—phenyl, —N—($C_7$-$C_{12}$)—aralkyl, —N—($C_7$-$C_{12}$)—alkyl—aryl— or —N—CO—($C_1$-$C_6$)—alkyl,
Y = —$CH_2$—$CH_2$—, —CH=CH—,

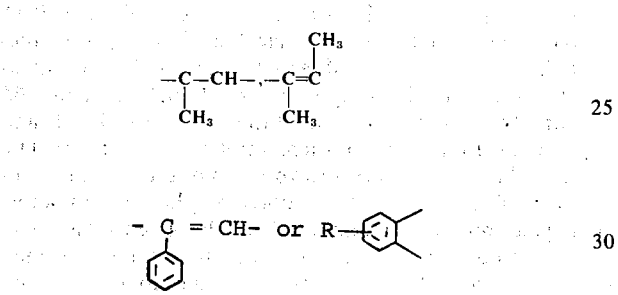

R = H, ($C_1$-$C_{12}$)—alkyl, ($C_1$-$C_{12}$)—alkoxy—carbonyl—, ($C_1$-$C_{12}$)—alkoxy and b. a phenol of the general formula

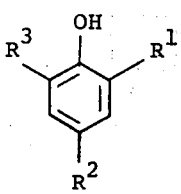

in which $R^1$ and $R^3$ may be the same or different and denote $C_1$-$C_9$—alkyl—, $C_5$-$C_6$—cycloalkyl, $C_7$-$C_9$—alkylaryl—, indanyl— or norbornyl groups and $R^2$=$R^1$ or —$CH_2$—$CH_2$—COO—($C_1$-$C_{12}$)—alkyl.

2. The process of claim 1, wherein the foamable reaction mixture contains from about 0.2% to about 2 % by weight of the mixture of (a) and (b).

3. The process of claim 2, wherein the mixture of (a) and (b) contains from 30 to 70% by weight of (b).

4. A polyurethane foam, which is substantially free from discoloration at the center thereof, comprising the product of an organic compound which has at least 2 active hydrogen atoms and an organic polyisocyanate reacted in the presence of a blowing agent, a catalyst which promotes reaction of the said organic compound with an organic polyisocyanate and a substance to prevent discoloration at the center of the resulting foam, said substance comprising a sufficient amount in effective proportions of a. a heterocyclic mercapto compound of the general formula

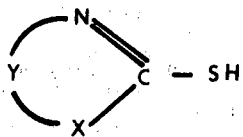

in which
X = —O—, —S—, —NH—, —N—($C_1$-$C_{12}$)—alkyl, —N—($C_5$-$C_6$)—cycloalkyl—, —N—phenyl, —N—($C_7$-$C_{12}$)—aralkyl, —N—($C_7$-$C_{12}$)—alkyl—aryl— or —N—CO—($C_1$-$C_6$)—alkyl;
Y = —$CH_2$—$CH_2$—, —CH=CH—,

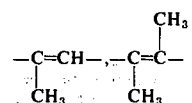

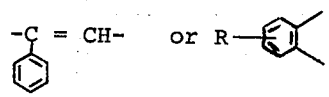

R = H, ($C_1$-$C_{12}$)—alkyl, ($C_1$-$C_{12}$)—alkoxy—carbonyl—, ($C_1$-$C_{12}$)—alkoxy—and b. a phenol of the general formula

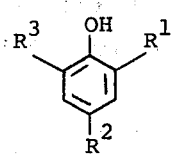

in which $R^1$ and $R^3$ may be the same or different and denote $C_1$-$C_9$—alkyl, $C_5$-$C_6$—cycloalkyl—, $C_7$-$C_9$—alkyl—aryl—, indanyl— or norbornyl groups and $R^2$ = $R^1$ or —$CH_2$—$CH_2$—COO—($C_1$-$C_{12}$)—alkyl.

5. The method of stabilizing a polyurethane foam against discoloration at the center produced during foaming which comprises effecting the foaming reaction in the presence of the sufficient amount in effective proportions of a. a heterocyclic mercapto compound of the general formula

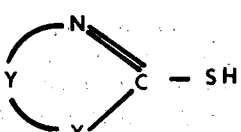

in which
X = —O—, —S—, —NH—, —N—($C_1$-$C_{12}$)—alkyl —N—($C_5$-$C_6$)—cycloalkyl—, —N—phenyl, —N—($C_7$-$C_{12}$)—aralkyl, —N—($C_7$-$C_{12}$)—alkyl—aryl— or —N—CO—($C_1$-$C_6$)—alkyl,
Y = —$CH_2$—$CH_2$—, —CH=CH—,

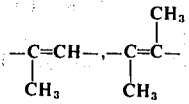

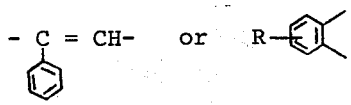

R = H, (C$_1$-C$_{12}$)—alkyl, (C$_1$-c$_{12}$)—alkoxy—carbonyl—, (C$_1$-C$_{12}$)—alkoxy and b. a phenol of the general formula

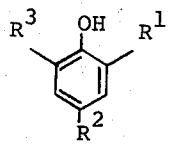

in which R$^1$ and R$^3$ may be the same or different and denote C$_1$-C$_9$—alkyl—, C$_5$-C$_6$—cycloalkyl—, C$_7$-C$_9$—alkylaryl—, indanyl— or norbornyl groups and R$^2$ = R$^1$ or —CH$_2$—CH$_2$—COO—(C$_1$-C$_{12}$)—alkyl.

6. The process of claim 5, wherein the heterocyclic mercapto compound has the formula

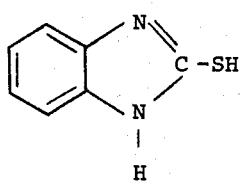

and the phenol has the formula

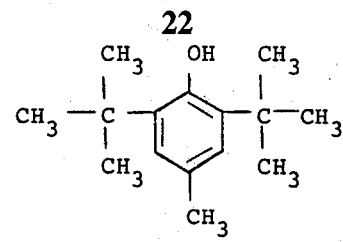

7. The process of claim 5 wherein the heterocyclic mercapto compound has the formula

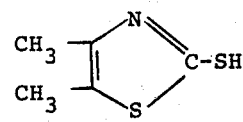

and the phenol has the formula

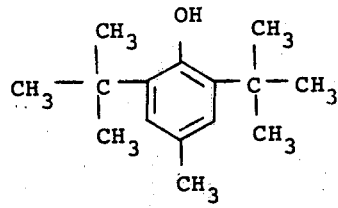

* * * * *